Figure 1:
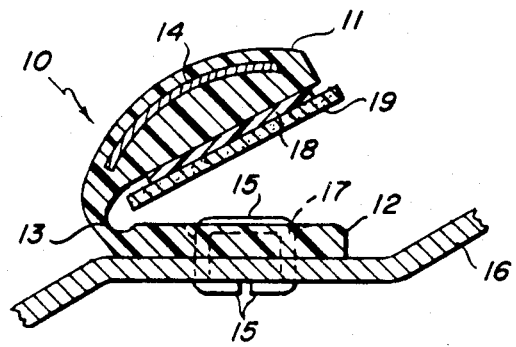

United States Patent [19]

Wolters

[11] Patent Number: 4,491,614
[45] Date of Patent: Jan. 1, 1985

[54] FOLDABLE TRIM STRIP WITH MOUNTING PORTION

[75] Inventor: Dennis R. Wolters, Dayton, Ohio

[73] Assignee: Protective Treatments, Inc., Dayton, Ohio

[21] Appl. No.: 506,351

[22] Filed: Jun. 21, 1983

Related U.S. Application Data

[62] Division of Ser. No. 393,373, Jun. 29, 1982, Pat. No. 4,401,701.

[51] Int. Cl.³ ............................................. B60R 13/04
[52] U.S. Cl. ........................................ 428/31; 52/716; 293/1; 428/133
[58] Field of Search ............... 428/31, 99, 133; 293/1; 52/716

[56] References Cited

U.S. PATENT DOCUMENTS

| | | | |
|---|---|---|---|
| 1,884,440 | 10/1932 | Welch | 52/716 X |
| 3,687,502 | 8/1972 | Loew | 428/31 X |
| 3,687,794 | 8/1972 | Shanok et al. | 428/31 |
| 3,896,245 | 7/1975 | Seto et al. | 428/31 X |
| 4,010,297 | 3/1977 | Wenrick | 428/31 |
| 4,243,711 | 1/1981 | Wenrick | 428/31 |
| 4,308,704 | 1/1982 | Lloyd | 428/31 X |
| 4,349,592 | 9/1982 | Nussbaum | 428/31 |
| 4,401,701 | 8/1983 | Wolters | 428/133 X |

Primary Examiner—Henry F. Epstein
Attorney, Agent, or Firm—Dressler, Goldsmith, Shore, Sutker & Milnamow, Ltd.

[57] ABSTRACT

An elongated trim strip is disclosed which includes an elongated mounting portion, an elongated decorative portion extending to one side of the mounting portion and a flexible connection between the two. At least one of the decorative portion and the mounting portion having means for joining the two portions together when the decorative portion is folded down upon the mounting portion. The mounting portion and the decorative portion are preferably configured to snap together.

4 Claims, 2 Drawing Figures

FOLDABLE TRIM STRIP WITH MOUNTING PORTION

This is a division of application Ser. No. 393,373, filed June 29, 1982, now U.S. Pat. No. 4,401,701.

DESCRIPTION

1. Technical Field

This invention relates to a trim strip which is foldable to include a mounting portion which can be secured to a fascia or body side molding and a decorative portion which can be folded down and secured to the mounting portion.

2. Background Art

The application of elongated trim strips to supporting substrates in order to decorate the same is well known, but there are problems in that one must quickly and easily secure the trim strip to the support and, at the same time, provide a decorative surface which is not disturbed by the means used to achieve the desired securement. This is particularly difficult to achieve when the securement is mechanical instead of adhesive.

One effort in this direction is that shown in Wenrick's U.S. Pat. No. 4,243,711 in which the trim strip is formed in two pieces, one piece being mechanically secured to a fascia, and the second piece being secured to the first piece. However, two separate pieces are required. Similarly, Wenrick's U.S. Pat. No. 4,010,297 employs a two-piece trim strip and the second piece is bonded to the first which is secured to the underlying substrate. Two pieces add expense and can separate.

DESCRIPTION OF INVENTION

In accordance with this invention, an elongated trim strip is formed to include an elongated mounting portion, an elongated decorative portion extending to one side of said mounting portion, and a flexible connection between the two, and at least one of said decorative portion and said mounting portion having means for joining said two portions when the decorative portion is folded down upon said mounting portion. When in the unfolded position, the decorative portion is out of the way when the mounting portion is secured to an an underlying substrate or fascia, and the decorative portion can be secured to the mounting portion after the same has been mounted and without disturbing the decorative surface of said decorative portion.

In preferred practice, the decorative portion and the mounting portion are extruded in a single piece with a flexible connection joining the two portions in the form of a thin connecting web between the two. Polyvinyl chloride plastic is the preferred material for extrusion, but other plastics are known to constitute trim strips. The decorative surface is formed on the side of the decorative portion remote from the facing surface of the mounting portion, or is visible from that side.

The undersurface of the mounting portion may be provided with an adhesive layer to enable the desired mounting, but it is preferred to employ a mechanical securement, such as sewing, stapling, darts or self-locking eyelets. For such purpose, the mounting portion desirably includes depressions or holes to facilitate the sewing or stapling operation.

The decorative portion annd the mounting portion include facing surfaces, and one or the other or both of these surfaces may include means for joining the two portions together when they are folded together. A simple adhesive layer protected with a release liner will serve this purpose, but it is preferred to employ a mechanical interlock which will snap together when the two portions are folded together.

One snap together structure which may be employed is an edge plastic stud extending inwardly of the outer edge of the decorative portion and which includes a beveled portion which snaps under a ledge carried by the outer edge of the mounting portion. In this way, the two portions will mechanically lock together with the locking elements being concealed beneath the outer edge of the folded down decorative portion.

Figure 2:
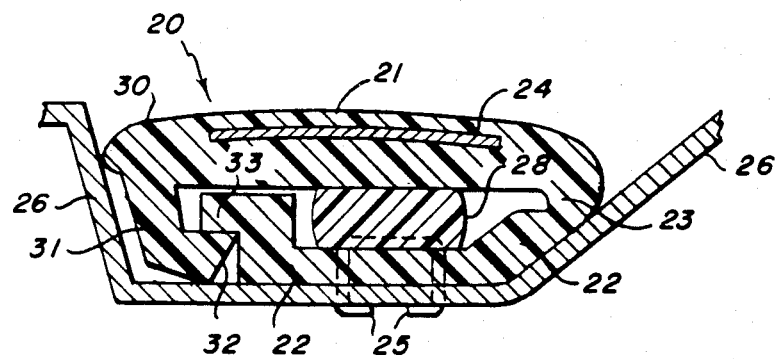

This invention will be more fully understood from the accompanying drawings in which:

FIG. 1 is a side elevation, in section, showing a trim strip formed in accordance with this invention stapled to a fascia to decorate the same; and FIG. 2 is a side elevation, in section, showing a modified trim strip in accordance with this invention configured to snap together.

Referring more particularly to FIG. 1, an elongated polyvinyl chloride extrusion 10 is formed in a single piece to include a decorative portion 11, a mounting portion 12 and a flexible web 13 connecting the two. The web 13 is thinner than the decorative and mounting portions, and hence is preferentially flexible.

In normal practice one must form two separate pieces and this adds expense.

The decorative portion is formed of clear plastic which encapsulates a reflective layer 14, which is visible through the side of the decorative portion remote from the mounting portion.

In FIG. 1, a staple 15 is shown securing the mounting portion 12 to the fascia 16, which may be a portion of an automobile bumper. The mounting portion 12 may be formed with holes or a depression 17 to facilitate penetration of the mounting portion as part of the mounting operation.

The surface of the decorative portion 11 which faces the mounting portion 12 has bonded thereto a bonding tape 18 which is protected by a release liner 19. The release liner is removed after the staples 15 have been used, whereupon the decorative portion is folded down upon the facing surface of the mounting portion.

The trim strip shown in FIG. 2 illustrates a preferred form of the invention which snaps together. This modified trim strip 20 has a decorative portion 21 and a mounting portion 22 which are interconnected by a flexible web 23. The decorative portion 21 is of clear polyvinyl chloride plastic having encapsulated within it a reflective layer 24. The mounting portion 22 may be pigmented for decoration or strength.

When trim strip 20 is in its unfolded position, the mounting portion 22 is mechanically secured to the fascia 26 by staples 25. Then, a release liner (not shown in this figure) is removed to uncover an elastomer tape 28 carried by the facing surface of decorative portion 21 (in the manner shown in FIG. 1) and this tape 28 helps to hold the folded structure in its folded position. However, the primary holding means is a self-locking mechanical snap which will now be described.

The outer edge 30 of the decorative portion 21 is formed with an inwardly extending plastic stud 31 which includes a beveled portion 32 which is positioned to snap under an outwardly extending elevated ledge 33 carried at the outer edge of the mounting portion 22. FIG. 2 shows the structure in its snapped together folded position. As can be seen, the securing structure is concealed by the decorative portion 21.

What is claimed is:

1. An elongated trim strip formed to include an elongated mounting portion, an elongated decorative portion extending to one side of said mounting portion and a flexible connection between the two foldably connecting the inner edges of said two portions, and means for joining said two portions when the decorative portion is folded down upon said mounting portion, said joining means comprising an outwardly extending elevated ledge carried at the outer edge of said mounting portion and a stud positioned at the outer edge of said decorative portion, said stud extending downwardly and then inwardly, the inwardly extending portion including a beveled portion positioned at the inner end thereof, said beveled portion engaging said ledge to move said stud outwardly when said decorative portion is folded upon said mounting portion so that said stud is adapted to snap under said ledge.

2. An elongated trim strip as recited in claim 1, in which said trim strip is an extrusion in which said decorative portion, said mounting portion and the flexible connection therebetween are extruded in a single piece with said flexible portion having the form of a thin connecting web extending between said decorative portion and said mounting portion.

3. An elongated trim strip as recited in claim 1, in which the undersurface of said decorative portion is flat.

4. An elongated trim strip as recited in claim 3 in which an adhesive layer is also present to hold said portions together in the folded position.

* * * * *